US011280731B2

United States Patent
Fazzio

(10) Patent No.: US 11,280,731 B2
(45) Date of Patent: Mar. 22, 2022

(54) FIRE EXTINGUISHING AGENT CONCENTRATION MEASURING SYSTEM AND METHOD OF MEASURING A FIRE EXTINGUISHING AGENT WITHIN AN ENVIRONMENT

(71) Applicant: Kidde Technologies, Inc., Wilson, NC (US)

(72) Inventor: Mark P. Fazzio, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/910,873

(22) Filed: Jun. 24, 2020

(65) Prior Publication Data

US 2021/0404954 A1 Dec. 30, 2021

(51) Int. Cl.
*G01N 21/53* (2006.01)
*A62C 99/00* (2010.01)

(52) U.S. Cl.
CPC .......... *G01N 21/53* (2013.01); *A62C 99/0045* (2013.01)

(58) Field of Classification Search
CPC ............ G01N 21/53; G01N 15/06; G01N 2015/0053; G01N 2015/0693; A62C 99/0045; A62C 37/00
USPC ........... 356/356, 335–343, 432–444, 243.2
See application file for complete search history.

(56) References Cited

U.S. PATENT DOCUMENTS

| | | |
|---|---|---|
| 4,434,655 A | 3/1984 | Summerfield et al. |
| 7,090,028 B2 | 8/2006 | Adiga et al. |
| 8,004,684 B2 | 8/2011 | Powell et al. |
| 8,439,630 B2 | 5/2013 | Lemieux et al. |
| 9,111,427 B2 | 8/2015 | Knox et al. |
| 9,207,172 B2 | 12/2015 | Seebaluck et al. |
| 2010/0259756 A1* | 10/2010 | Powell .............. A62C 37/50 356/437 |
| 2014/0233017 A1* | 8/2014 | Hariram ............ G01N 15/14 356/72 |

FOREIGN PATENT DOCUMENTS

WO 2012126469 A1 9/2012

OTHER PUBLICATIONS

Extended European Search Report for EP Application No. 21181553.5, dated Nov. 8, 2021, pp. 1-13.

* cited by examiner

*Primary Examiner* — Tri T Ton
(74) *Attorney, Agent, or Firm* — Cantor Colburn LLP

(57) ABSTRACT

A fire extinguishing agent concentration measuring system having a first window, a second window positioned relative to the first window thereby defining a sensing volume between the first window and the second window, and a structure positioned relative to the first window and the second window configured to cause fluid flowing into the sensing volume from an environment within which the fire extinguishing agent concentration measuring system is placed to swirl within the sensing volume.

8 Claims, 1 Drawing Sheet

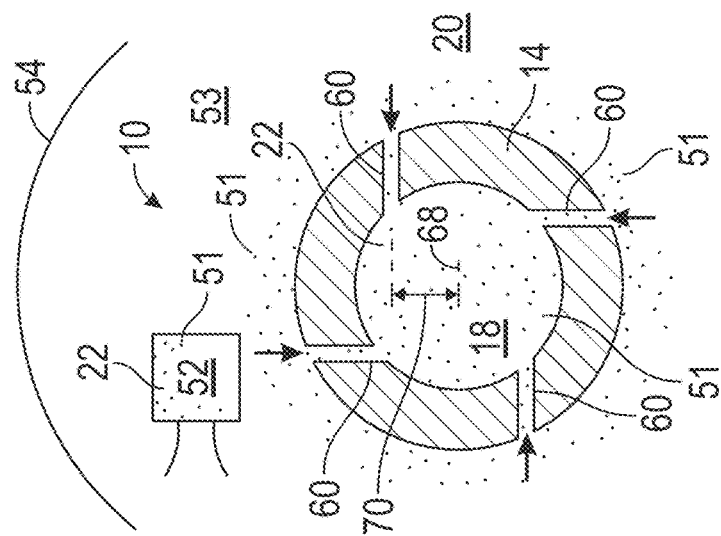
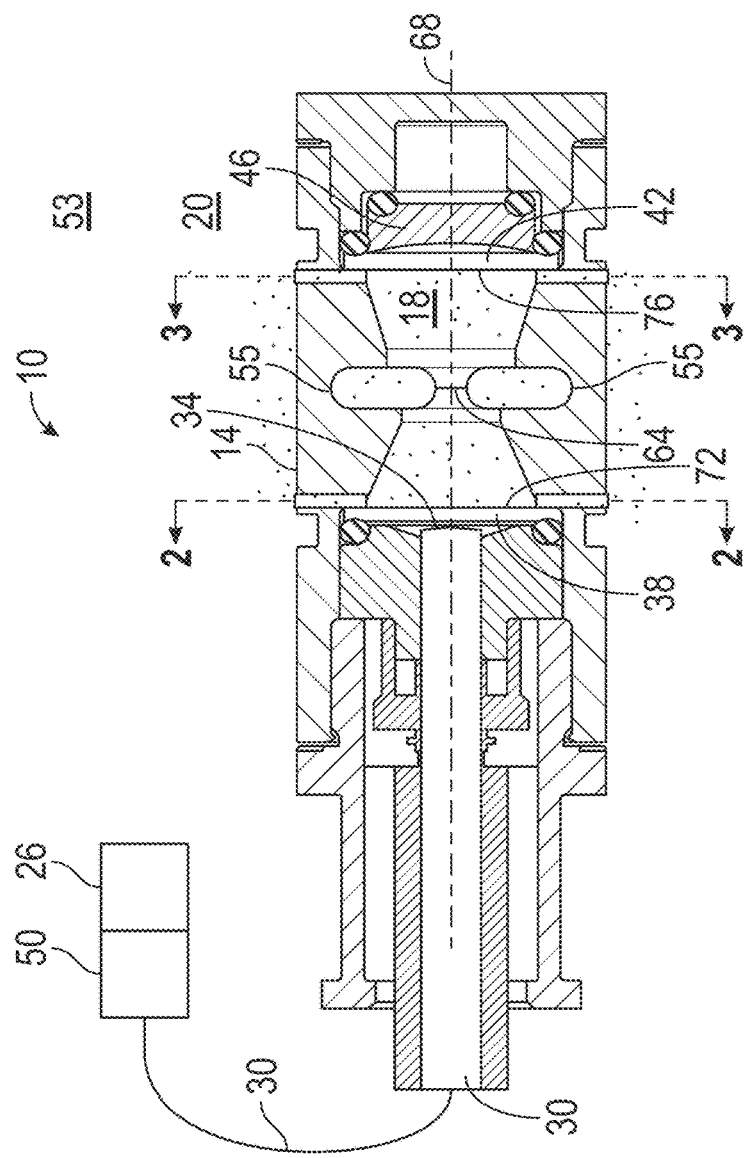

FIRE EXTINGUISHING AGENT CONCENTRATION MEASURING SYSTEM AND METHOD OF MEASURING A FIRE EXTINGUISHING AGENT WITHIN AN ENVIRONMENT

BACKGROUND

Fire extinguishing systems employ agents that are deployed to an environment to extinguish fire in the environment. Some conventional systems employ Halon, a liquefied, compressed gas that stops the spread of fire by chemically disrupting combustion. Halon is contributing to ozone depletion, so alternatives to Halon are being sought. Some alternatives include dry solid particulates that are dispersed within the environment. The distribution and concentration of the particulates within the environment is important to the effectiveness of the system. As such, systems and methods to test and/or monitor such concentrations are of interest.

BRIEF DESCRIPTION

Disclosed herein is a fire extinguishing agent concentration measuring system. The system includes a first window, a second window positioned relative to the first window thereby defining a sensing volume between the first window and the second window, and a structure positioned relative to the first window and the second window configured to cause fluid flowing into the sensing volume from an environment within which the fire extinguishing agent concentration measuring system is placed to swirl within the sensing volume.

Also disclosed herein is a method of measuring a fire extinguishing agent within an environment. The method includes, allowing fluid from the environment to pass through a structure and into a sensing volume defined between a first window and a second window, swirling the fluid within the sensing volume, detecting light passing through the sensing volume, and determining a concentration of the fire extinguishing agent present in the fluid.

BRIEF DESCRIPTION OF THE DRAWINGS

The following descriptions should not be considered limiting in any way. With reference to the accompanying drawings, like elements are numbered alike:

FIG. 1 depicts a cross-sectional view of an embodiment of a fire extinguishing agent concentration measuring system disclosed herein; and FIG. 2 depicts an alternate partial cross-sectional view of the embodiment of FIG. 1 taken at arrows 2-2 or 3-3.

DETAILED DESCRIPTION

A detailed description of one or more embodiments of the disclosed apparatus and method are presented herein by way of exemplification and not limitation with reference to the Figures.

FIGS. 1 and 2 depict an embodiment of a fire extinguishing agent concentration measuring system disclosed herein identified by reference character 10. The system 10 includes, a structure 14 defining a sensing volume 18 through which a fluid 20 (the fluid 20 containing a fire extinguishing agent 22) passes. Light is provided from a light source 26 through an optical fiber 30. The light is transmitted from an end 34 of the optical fiber 30 through a first window or lens 38, then through the sensing volume 18, through a second window 42 and impinges on a mirror 46. Light reflected from the mirror 46 travels in reverse back to a sensor 50 located near the light source 26. The sensor 50 is calibrated to detect light received and correlate it to a concentration of the agent 22 present in the fluid 20 based on scatter of the light caused by the presence of the agent 22. While the embodiments illustrated in the figures herein include items such as, the structure 14, the mirror 46, and the optical fiber 30, alternate embodiments are contemplated that don't require these specific items.

The agent 22 may consist of solid particulates 51 that are emitted from a container 52 configured to hold the agent 22 until dispersion of the agent 22 is needed such as in the event of a fire, for example. The container 52 may be positioned within an environment 53 which may be housed within a turbine engine 54 or other system wherein quick extinguishment of a fire is desired.

Openings 55 in the structure 14 fluidically connect the sensing volume 18 to the environment 53 containing the fluid 20 with the agent 22. As such, the fluid 20 is free to pass between the environment 53 and the sensing volume 18 through the openings 55. Similarly, at least orifice 60, with a plurality being illustrated herein, in the structure 14 also fluidically connects the sensing volume 18 to the environment 53, thereby allowing an additional way for the fluid 20 containing the agent 22 to pass between the environment 53 and the sensing volume 18. The orifices 60 differ from the openings 55 in at least two ways. Firstly, instead of being located near a center 64 between the windows 38 and 42, the orifices 60 are located nearer to one of the windows 38, 42. And secondly, the orifices 60 are oriented such that the fluid 20 flowing through them from the environment 53 and into the sensing volume 18 is not directed toward an axis 68 of the system 10 but instead is directed to an offset dimension 70, shown in FIG. 2, from the axis 68. The axis 68 is defined by a path light travels between the end 34 of the optical fiber 30 and the mirror 46. That is, the orifices 60 direct fluid 20 some distance (i.e., the offset dimension 70) away from the path that light travels (i.e., the axis 68).

These characteristics of the orifices 60 tend to move the fluid 20 flowing through them into the sensing volume 18 in such a way that settling of the particulates 51 on surfaces 72 and 76 of windows 38 and 42, respectively, is discouraged. The proximity of the orifices 60 to one of the surfaces 72, 76 urges the fluid 20 flowing through the orifices 60 to move with a larger velocity near to the surfaces 72, 76 than if the orifices 60 were further from the surfaces 72, 76. The offset dimension 70 set by the aim of the orifices 60 relative to the axis 68 creates a swirling action of the fluid 20 as it flows into the sensing volume 18 through the orifices 60. This swirling action also acts to maintain a larger velocity of the fluid 20 flowing within the sensing volume 18 than would occur if the offset dimension 70 did not exist, since flows could directly impinge on each other in opposing directions thereby decreasing velocity of the flows.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire extinguishing agent concentration measuring system comprising:
   a first window;
   a second window positioned relative to the first window thereby defining a sensing volume between the first window and the second window, wherein light is configured to travel a path between the first window and the second window along an axis; and
   a structure between the first window and the second window, the structure including openings for flow of fluid into the sensing volume from an environment within which the fire extinguishing agent concentration measuring system is placed, and the structure additionally including a first plurality of orifices between the openings and the first window for flow of the fluid into the sensing volume and for the fluid to swirl within the sensing volume, the first plurality of orifices being arranged at different radial positions from the axis.

2. The fire extinguishing agent concentration measuring system of claim 1, further comprising a second plurality of orifices between the openings and the second window for flow of the fluid into the sending volume, the second plurality of orifices being arranged at different radial positions from the axis, wherein the flow of the fluid from the first set of orifices and the second plurality of orifices is to an offset dimension from the axis.

3. The fire extinguishing agent concentration measuring system of claim 1, wherein the first plurality of orifices and the second plurality of orifices of the structure are configured to cause fluid flowing through the sensing volume to swirl around the axis.

4. The fire extinguishing agent concentration measuring system of claim 1, wherein an agent includes dry solid particulates.

5. The fire extinguishing agent concentration measuring system of claim 1, further comprising an optical fiber configured to transmit light through the first window, the sensing volume and the second window.

6. The fire extinguishing agent concentration measuring system of claim 1, further comprising a sensor configured to determine a concentration of an agent in the fluid based on an amount of light scattered by the agent.

7. A method of measuring a fire extinguishing agent within an environment, comprising:
   arranging a structure between a first window and a second window that define a sensing volume therebetween, the structure having openings configured for flow of fluid into the sensing volume from an environment in which the structure is disposed, wherein the arranging the structure includes arranging a light source such that light travels between the first window and the second window along an axis;
   forming the structure with a first plurality of orifices between the openings and the first window, the first plurality of orifices being arranged at different radial positions from the axis to allow fluid from the environment to pass into the sensing volume and swirl within the sensing volume;
   arranging a sensor to detect the light passing through the sensing volume and to determine a concentration of the fire extinguishing agent present in the fluid.

8. The method of measuring a fire extinguishing agent a fluid within an environment of claim 7, further comprising forming the structure with a second plurality of orifices between the openings and the second window, the second plurality of orifices being arranged at different radial positions from the axis and allowing fluid from the environment to pass into the sensing volume and swirl within the sensing volume.

* * * * *